(12) United States Patent
Messia et al.

(10) Patent No.: US 12,022,365 B2
(45) Date of Patent: Jun. 25, 2024

(54) SYSTEM FOR SELECTIVELY MANAGING AND SHARING INFORMATION BASED UPON TELEMATIC INFORMATION RELATED TO MOBILE DEVICES

(71) Applicant: TRANSFINDER CORPORATION, Schenectady, NY (US)

(72) Inventors: Joseph Messia, Schenectady, NY (US); Antonio Civitella, Schenectady, NY (US)

(73) Assignee: TRANSFINDER CORPORATION, Schenectady, NY (US)

(*) Notice: Subject to any disclaimer, the term of this patent is extended or adjusted under 35 U.S.C. 154(b) by 97 days.

(21) Appl. No.: 17/456,981

(22) Filed: Nov. 30, 2021

(65) Prior Publication Data

US 2023/0171568 A1    Jun. 1, 2023

(51) Int. Cl.
*H04W 4/20* (2018.01)

(52) U.S. Cl.
CPC ..................... *H04W 4/20* (2013.01)

(58) Field of Classification Search
CPC .......... H04W 4/20; H04W 4/40; H04W 67/55
See application file for complete search history.

(56) References Cited

U.S. PATENT DOCUMENTS

| | | |
|---|---|---|
| 2009/0006870 A1 | 1/2009 | Duri et al. |
| 2011/0153367 A1 | 6/2011 | Amigo et al. |
| 2014/0164514 A1* | 6/2014 | Eteminan ............... H04L 65/00 709/204 |
| 2014/0189888 A1 | 7/2014 | Madhok et al. |
| 2016/0093216 A1 | 3/2016 | Lee et al. |
| 2018/0287851 A1* | 10/2018 | Twombly ............. H04L 67/535 |
| 2019/0220526 A1* | 7/2019 | Lear ................... G01C 21/3679 |
| 2021/0326774 A1 | 10/2021 | Mendes et al. |

OTHER PUBLICATIONS

International Search Report and Written Opinion issued in PCT/US2022/80484 and dated Feb. 24, 2023.

* cited by examiner

*Primary Examiner* — James P Duffy
(74) *Attorney, Agent, or Firm* — Heslin Rothenberg Farley & Mesiti P.C.; Nicholas Mesiti

(57) ABSTRACT

A method of managing and sharing information based upon telematic information related to mobile devices includes one or more processors receiving telematic data from one or more mobile devices. The processors receive trigger criteria from at least one processing entity. The trigger criteria is based upon the telematic data and represents an event to initiate a request to share information relating to the mobile devices. The processors automatically initiate a notification representing a request to share the information with at least one external third party device based upon the telematic data corresponding to the trigger criteria. The processors then automatically share the information with the at least one external third party device based upon a response to the notification and facilitate display of the information on the at least one external third party device.

21 Claims, 6 Drawing Sheets

Processors, servers and memory where data is transmitted and processes and algorithms are run Processing Entity/Administrator Mobile Devices Third Party Devices Trigger Criteria and Sharing Instructions GPS Telematic Data Processes and Algorithms Processed Information for Sharing

SYSTEM FOR SELECTIVELY MANAGING AND SHARING INFORMATION BASED UPON TELEMATIC INFORMATION RELATED TO MOBILE DEVICES

FIELD OF THE INVENTION

This invention relates, in general, to mobile devices such as vehicles or mobile communication devices, and in particular, to a system for selectively managing and sharing information based upon telematic information related to mobile devices.

BACKGROUND

Mobile devices include objects which are capable of movement such as vehicles (e.g., cars, trucks, buses and trolleys) or mobile communication devices, including mobile cellular devices and wireless communication and computing devices. Mobile devices such as buses or trucks may be used to provide services, such as transporting persons and delivering products or other cargo. Also, fleets of vehicles are often used to travel particular travel routes. Telematic information or data includes real time information or data relating to mobile devices including vehicles or mobile communication devices. Such information or data typically relates to conditions of the mobile device including but not limited to location information, kinetic or kinematic information such as speed or direction, physical conditions of the mobile device or its environment such as electrical or mechanical conditions. However, any data or information generated, processed, stored, monitored, transmitted by or related to a mobile device may comprise telematic data. Telematic information or data may be communicated to other devices or processors to monitor various conditions of the mobile device. Selectively managing and sharing telematic data of mobile devices including fleets of vehicles either in real time, or historically, can be a difficult task.

One challenge in managing mobile devices including operating fleets of vehicles is the automatic managing and sharing of telematic information related to the mobile devices. Also, it is a challenge to automatically share real time telematic information of mobile objects selectively with other devices, and to maintain historical telematic information of multiple mobile objects including individual vehicles, such as buses within a fleet.

SUMMARY

Shortcomings of the prior art are overcome and additional advantages are provided through the provision of a method, system and/or computer program product for managing and sharing information based upon telematic information related to mobile devices. The method includes receiving, by one or more processors, telematic data from one or more mobile devices; receiving, by the one or more processors, one or more trigger criteria from at least one processing entity; automatically initiating, by one or more processors, a notification representing a request to share the information to at least one external third party device based upon the telematic data corresponding to the trigger criteria; performing an action, by the one or more processors, comprising automatically sharing the information with the at least one external third party device based upon a response to said notification; and facilitating displaying the information on the at least one external third party device. The trigger criteria is based upon the telematic data and represents an event to initiate a request to share information relating to the one or more mobile devices. The method is implemented to perform automatically via a computer system, including having multiple processors which may or may not be decentralized, and mobile communication and/or computing devices. The information shared to the third party devices may be the telematic information generated, monitored and/or received from the mobile devices, and/or information based upon such telematic information. The trigger criteria may be a single condition or multiple conditions.

The trigger criteria is controlled or controllable by the at least one processing entity, which may act as an administrator. The trigger criteria may be stored in memory associated with the one or more processors. The trigger criteria may comprise physical, environmental, geographical and/or time data relating to the one or more mobile devices. For example, the trigger criteria may include one or more of the date, time, whether the mobile devices enters a geographic region or leaves a geographic region, whether the mobile device deviated a preselected distance from a planned path, the distance from a selected location, elevation, temperature, humidity, precipitation, and other weather factors, as well as any data monitored, captured or transmitted by the mobile device such as motion starting or stopping, speed, direction, idle duration, engine status, mechanical and electrical vehicle conditions, tire pressure, events such as a door being open, lights activated, impact detected, fuel level, panic button activated, the embarking or disembarking of an object including passengers from a vehicle, and if the user of a mobile device indicates the start or end of an particular event or session.

The one or more mobile devices may include a vehicle, mobile computing device and/or mobile communication device such as a smartphone. The notification may include a link to access the information. The step of receiving one or more trigger criteria from at least one administrator may include which of said one or more mobile devices will be the subject of the request to share information, the information to be shared and/or when the information is shared. All or some of the mobile devices may be designated to share information with one or more of the third party devices. Specific information may be shared to specific third party devices based upon the trigger criteria selected. An unlimited number of combinations and permutations of trigger criteria, designated mobile devices for sharing information and corresponding third party devices to receive such information are possible. Each aforementioned step of the method is implemented to perform and occurs automatically via a computer system. Telematic data and information relating to or based upon such data may be stored in memory associated with the one or more processors. Also, information regarding the designation of mobile devices which may share information as well as information regarding associations between mobile devices and third party devices may also be stored in such memory.

The computer program product includes a computer readable storage medium readable by a processing circuit and storing instructions for performing the method, for example, as described above and herein. Also, computer-implemented systems relating to one or more aspects of the method are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
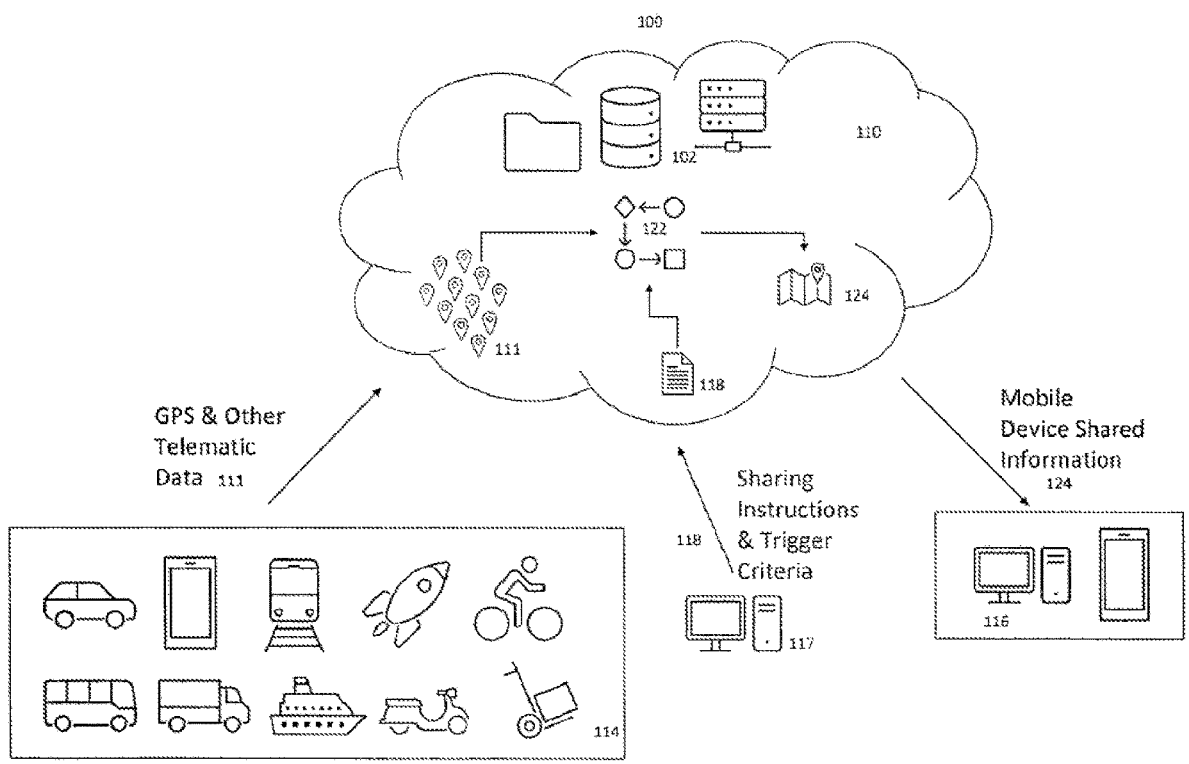
FIG. 1 depicts one example of schematic representation of a system in accordance with an aspect of the present invention.

In one or more aspects, a capability is provided for selectively managing and sharing information based upon telematic information related to mobile devices. The managing and sharing of information based upon telematic information is performed automatically via a computer system to designate a mobile object such as a mobile device or vehicle to automatically share information with external third party devices. Mobile objects may include mobile devices, such as wireless computing and/or communication devices (e.g., smart phones) and/or vehicles such as trucks, buses, airplanes, and trolleys. A mobile device may be instructed to share information based upon telematic information if certain conditions are met. The conditions are defined as a trigger criteria.

In one aspect or example, the system includes three different components all working together: mobile devices which collect and send GPS and other telematic data; a processing entity such as an administrator processor which can view, manage, and initiate sharing of the information based upon telematic data related to the mobile devices; and external third party devices which receive the shared data and can view the results of the data and information which has been shared with them.

The administration or processing entity may utilize, for example, a browser-based application that allows the user to manage and monitor devices transmitting GPS and telematic data as well as share that device data with non-administration third party devices. This administrative device may be a computer, phone, or tablet and acts as a dispatch where an administrator selects which device or devices will share telematic information with an external/third party device. The administration device selects which device or devices will share information, which data will be shared, and the trigger criteria used to determine when to share such information. The trigger criteria can include a date/time range, or another criteria to trigger the starting and ending sharing of information. These trigger criteria may include event data from mobile devices, environment factors, and/or location.

Trigger criteria may be setup by the administration processing entity users and can be done for event, location, time or other telematic data. An event example could be when a device indicates there has been hard breaking of a vehicle. Environment data such as temperature may trigger device sharing if the temperature goes above a set threshold. For location, a region could be set, such as a radius around an X-Y coordinate, and a trigger criteria created based on entering or exiting the region. For example, device sharing could be triggered when the device meets a specific criteria and stop sharing when it meets another criteria or no longer meets the first criteria. A combination of criteria could be used. For example: a criteria may allow or start sharing on Jul. 26, 2021 at 10:00 AM Eastern Standard Time and stop sharing when the vehicle reaches a specific location. At any point in time, sharing can be disabled by the administration processing entity before the time period has ended, the ending criteria has been met, or any of the set combination of triggers have occurred. The administration processing entity and users thereof can override the sharing whenever necessary.

Mobile devices may be any device or set of devices that can capture and transmit GPS data and other telematic data including video data. One or more mobile devices collects GPS data, as well as additional device and environment data and sends that data to a server. The mobile devices may be cell phones, tablets, GPS hardware, cars, trucks, planes, trains, boats, motorcycles, bicycles or any other device where GPS can be tracked. Telematic data a device may capture, in addition to location, could be heading, speed, breaking, engine idle, door open, lights activated, stop arm (in the case of a school bus). The data could also include other telematic data like odometer, harsh breaking, engine status, or other vehicle fault or diagnostic statuses. The telematic vehicle data may be collected, monitored and transmitted to the system using standard telematic location monitoring units. The data could also include video streaming. The data could also include environment data including temperature or other factors.

Once a trigger criteria is met and a mobile device is allowed to share information, a notification will be sent to the user of one or more corresponding designated external third-party devices. These external third-party devices are preferably not devices that are part of the data managed through the administration processing entity and do not require the administrator to have any information about the devices outside of a user's contact information such as email or phone number for notifications. Notifications can include text, email, or push notifications or any combination thereof. The notification may include an accessible link such as a URL; this link may give the external third-party device access to a web or other interface that will allow them to see the selected mobile devices and the shared information for the configured time range or when other specified trigger criteria has been met. The third-party device user can see the data in real time live in the given time range, specified geographic area, or for specified events. More than one mobile device can be configured for sharing at a single time or individual third-party configurations of device data to third-party users and devices may be setup.

Further details regarding selectively managing and sharing information based upon telematic information related to mobile devices are described with reference to FIG. 1. Aspects of this system or processes may be performed by a computer system including one or more processors in the mobile devices and/or processing entity, by one or more processors remote to the mobile devices and/or processing entity, or by a combination of processors in the mobile devices and/or processing entity and remote to the mobile devices. Many possibilities exist.

Figure 2:
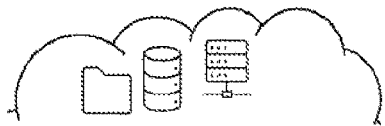
FIG. 2 depicts the components of the system shown in FIG. 1.
Figure 2:
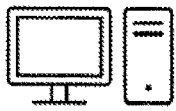
Figure 2:
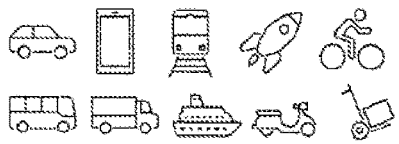
Figure 2:
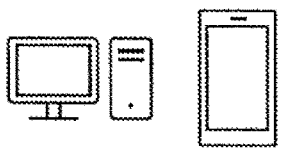
Figure 2:
Figure 2:
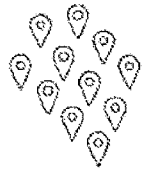
Figure 2:
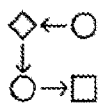
Figure 2:

Referring to FIGS. 1 and 2, aspects of a system in accordance with an exemplary embodiment for selectively managing and sharing telematic information related to mobile devices is shown. A system 100 includes one or more processors or servers 102 where data is transmitted and processed and wherein specific algorithms 122 are performed. In one example, the system may be implemented via cloud computing 110. The system receives or obtains telematic data 111 including GPS data from the mobile devices 114. The telematic data 111 may be obtained by any viable method including receiving such information from a location monitoring unit, computer or mobile telecommunication device and/or generating the same from GPS data. Other techniques for obtaining telematic data 111 including GPS data may also be used to create, generate, and/or obtain the same. The telematic data may be stored in memory associated with the processors 102.

A plurality of mobile devices 114 are included as part of the system. These mobile devices may include automobiles, smart phones and other communication devices, mobile computers and tablets, trains, flying objects such as airplanes, bicycles, buses, trucks, watercraft, motorcycles, and trolleys or segways, as well as any other object which is capable of movement in which may generate telematic and information including GPS coordinates. The mobile devices 114 in accordance with the system, may be designated individually or collectively in groups to share information based upon their telematic data. Information regarding which mobile devices may share information and what information they may each share may be stored in the memory associated with the processors.

Some or all of the mobile devices 114 may be associated with one or more third party devices 116. Third party devices may be independent of the mobile devices and are capable of displaying information shared by the associated mobile devices 114. The third party devices are typically electronic devices, including processors and/or memory which are capable of displaying and/or processing telematic information. Such third party devices include smart phones, tablets, computers, and other processing units or systems including those in other stationary or mobile devices such as vehicles. Each third party device 116 is associated with at least one mobile device 114 and thus will display shared telematic information and data from its associated mobile device when authorized by the system. Information regarding the associations between mobile devices and third party devices may also be stored in memory associated with the processors 102.

One or more processing entities 117 will function as an administrative processing entity or administrator capable of controlling the system. The mobile devices 114, processing entities 117 and third party devices 116 may be in communication with each other and/or connected via a cloud computing system 110. Alternatively or additionally, mobile devices 114, processing entities 117 and third party devices 116 may be connected to one or more central processors or decentralized processors and memory. Typical cloud computing system 110 includes various processors and memories 102 which are capable of receiving telematic information 111 including GPS information from each of the mobile devices 114. Various algorithms 122 may be used in the cloud computing system 110 to process the telematic information. The processing entity 117 is in communication with the cloud computing system 110 to transmit trigger criteria and other sharing instructions 118 to the various processors 102 in the cloud computing system. The cloud computing system 110 is capable of sharing the information relating to the mobile devices 114 based upon the telematic data transmitted by the mobile devices 114 to the cloud computing system 110. Information which has been processed therein may be considered shared information from the mobile devices 114 and transmitted to the third party devices 116 along with a request to share information to such third party devices. The mobile devices 114 may include location monitoring units as well as diagnostic monitoring units which monitor store and/or transmit telematic information from the mobile devices to the cloud computing system 110.

The mobile devices 114 are enabled to send telematic data 111 including GPS data to the system 100 and the processors and/or servers 102. Third party devices 116 are designated and enabled to view the results of selectively managed and shared information based upon telematic information related to mobile devices 114. The third party devices 116 are allowed to view shared information from and relating to the mobile devices when a mobile device 114 is subject to a trigger criteria 118 based upon the telematic data or information. The trigger criteria 118 is defined by the processing entity 117, which may correspond to a system administrator device 117. Within the system 100 and memory associated therewith, the trigger criteria 118 and telematic information 111 may be stored in any desirable format. A process or algorithm 122 performed by the processors 102 uses the trigger criteria 118 and telematic data 111 to compare and process the same to determine if a trigger criteria has been met. Processes and algorithms involve calculations to compare the trigger criteria 118 with telematic data 111. The calculations generate a result 124 when one or more criteria of the trigger criteria are met. The result of such calculations may also be stored in memory and used for future use if desired. The system 100 will designate the mobile object as being allowed to share information including telematic information when the trigger criteria is met for any particular mobile device 114. The system 100 will then initiate a request to share information with and to authorized third party devices 116. The authorized third party devices may be defined by the processing entity 117 and/or the mobile devices 114. For example, each mobile device may have one or more third party devices associated therewith which are allowed to receive shared information when a trigger criteria has been met. The trigger criteria may be the same for each mobile device 114 or may be different for each mobile device, or may be a combination thereof.

When a trigger criteria has been met the system 100 via the processors 102 initiates a request to allow information for one or more mobile devices 114 to be sent to any associated authorized third party devices 116. The system may initiate the request by sending a notification via email, text or push notification to the authorized associated third party device. If the third party device responds positively to the notification, the system 100 shares information relating to the telematic information associated with the mobile device 114. The notification may include a link such as a URL sent to the third party devices, which when opened shows the particular shared information related to the mobile device 114. The shared information may then be displayed on the third party devices for which the information has been shared. For example, the system 100 can share with the associated third party devices' information based upon the telematic information from the associated mobile devices' user when a trigger criteria has been met by any of the mobile devices. All information regarding the notifications, openings or confirmations thereof and sharing of information may be stored in memory associated with the processors.

For example, if a mobile device has entered a particular geographic area, route and/or experienced a particular condition such as starting or stopping at a particular location and/or time, the system can allow such information to be shared. Also, the system may store the information for later use with data analytics. Trigger criteria 118 may be based at least in part on telematic data 111 including GPS data. For example, trigger criteria 118 may include time conditions, geographic conditions, environmental conditions, altitude, weather, physical, kinetic and/or kinematic conditions such as speed, direction, acceleration and/or braking, and/or mechanical or electrical conditions related to the mobile devices including vehicles. Many possibilities exist so long as the information is based upon telematic data readable and transmissible by mobile devices 114. Furthermore, the processing entity 117 may control or designate which specified mobile devices 114 will share information and what type of information will be monitored and/or shared by each mobile device. Not all mobile devices may be designated as sharing the same information and some mobile devices may be designated as sharing different information than other mobile devices. And, only some of all the mobile devices may be designated as sharing information at all. The system may be configured so that essentially an infinite number of combinations and permutations of mobile devices and telematic data may be shared. The processing entity 117 manages and monitors the mobile devices 114 and their designation to share data and their trigger criteria. The processing entity 117 may also be configured to view any shared information from any of the mobile devices 114.

For example, the system may be used to manage and share information related to a school bus, as one mobile device, and multiple smart phones, as other mobile devices, of students riding the bus. The system may be configured so that certain trigger criteria based upon telematic information of the bus will initiate the sharing of information by the bus. For example, the system may be configured so the processing entity (or mobile devices) creates a trigger criteria based upon the brakes of the bus being engaged in an emergency braking situation as measured by acceleration, deceleration and/or braking telematic data; a request to share information by the bus is initiated. However, the trigger criteria for the smart phones may be different and based upon, for example, a geographic area and time wherein when the GPS coordinates of the smart phones are within a specified area at a given time range. Thus, different information from the smart phones and bus may initiate a request to share different information from each of the smart phones and bus. For example, the smart phones may initiate a request to share information when the phones are in a particular geographic area during a particular time range and the bus may initiate a request to share information when it engages in an emergency braking maneuver. Furthermore, the system may be configured to initiate a request to share information when a particular combination of events constitute a trigger criteria. For example, with respect to the above example, when the trigger criteria includes emergency braking of the bus and one or more of the smart phones are in a geographic area during a particular time. Thus, when both events occur, based upon the telematic data indicating the same, a request to share information is initiated by the system. Finally, the information shared by each mobile device may be different (or the same). For example, in the above example, the bus may share information about its location and a video of its movement at the time of the trigger criteria while the smartphones may share information about their geographic location and video of the passenger/smart phone user. The processing entity 117 acting as an administrator can manage and view all the shared information. The memory associated with the processors (or any other memory device) may store all information recorded, monitored, generated, processed, received and transmitted by the system for real time or subsequent use and analysis.

Figure 3:
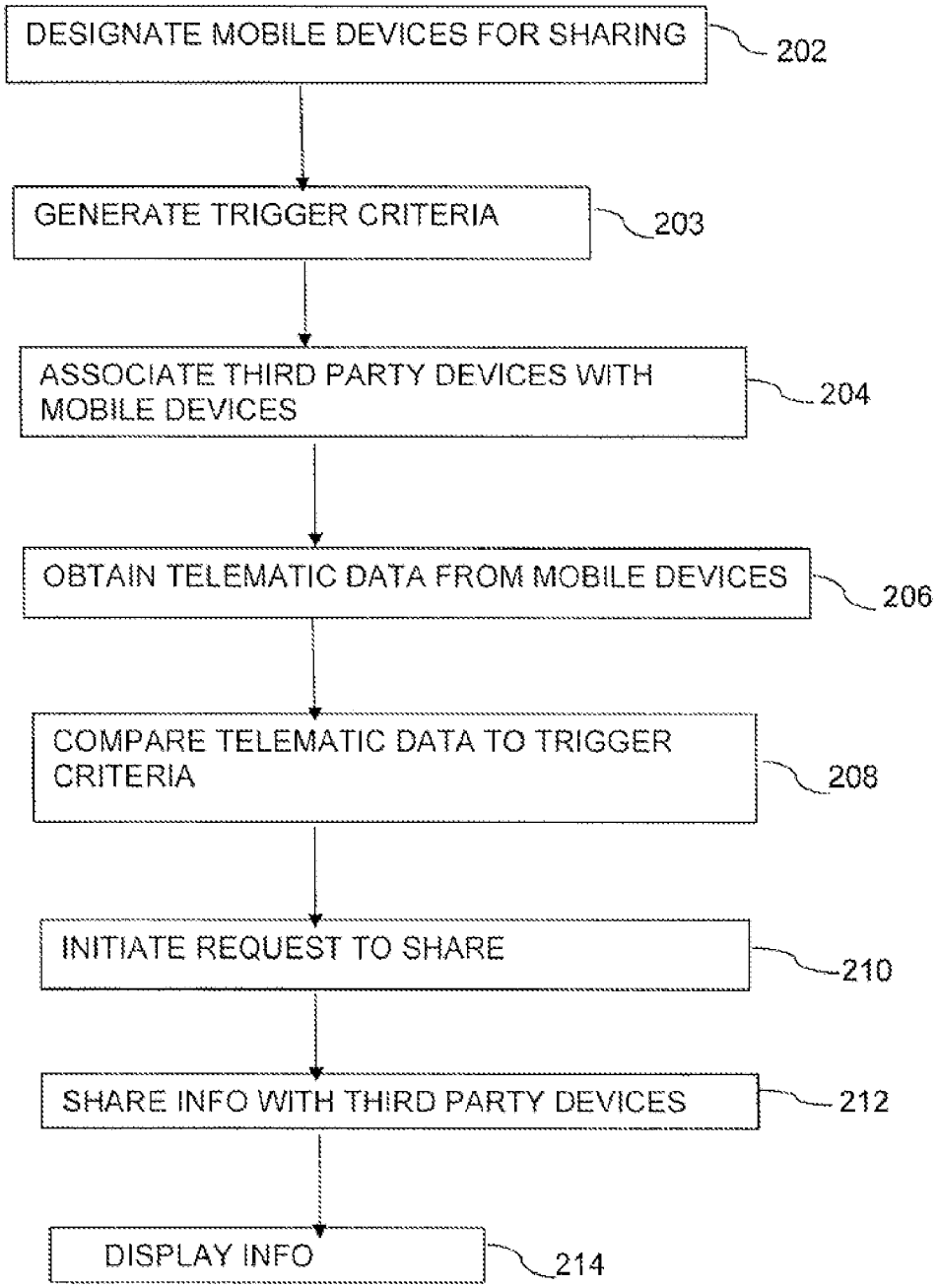
FIG. 3 depicts one example of a flow diagram of the processes performed in accordance with an aspect of the present invention.

Referring now to FIG. 3, an example of the process steps for selectively managing and sharing information based upon telematic information related to mobile devices will be described in more detail. Within the system 100 (shown in FIG. 1), mobile devices 114 may be configured and designated for sharing in step 202; which can be initiated by the processing entity 117 system administrator device or by the mobile devices or a combination thereof. As part of step 202, processing entity or administrator 117 may designate specific mobile devices 114 for sharing information about the mobile devices (based upon their telematic data) to associated third party devices 116. In one variation, the mobile devices may confirm and/or authenticate their identities to participate in the sharing of information. Each mobile device may be designated to share the same information, different information or some combination thereof. The details regarding the designations of each mobile device may be stored in the system memory.

In step 203 the trigger criteria 118 may be generated by the processing entity 117. In this step, the processing entity or administrator 117 establishes trigger criteria and transmits the same to the cloud computing system 110 and processors 102. As explained herein, the trigger criteria may be any event and/or condition, which may be determined by interpretation and/or processing of the telematic data from the mobile devices 114. The trigger criteria for each mobile device may also be stored in the system memory. As an alternative, the trigger criteria can be generated by one or more of the mobile devices 114, or by a combination of both one or more of the mobile devices and the processing entity 117.

In step 204, the third party devices are associated with mobile devices. And, the mobile devices 114 (shown in FIG. 1) may be configured to designate their associated third party devices or confirm the designation of an associated third party device assigned by the processing entity 117. Each mobile device 114 is associated with one or more third party devices 116 and additionally and alternatively, any infinite number of combinations of permutations of associations between mobile devices 114 and third party devices 116 may occur. In one variation, the mobile devices and third party devices may confirm and/or authenticate their associations to participate in the sharing and/or receiving of information. Each association between a third party device and mobile device may be stored in the system memory.

In step 206, one or more processors 102 in computing environment 110 (shown in FIG. 1) obtain telematic data including GPS information 111 and coordinates data from the mobile devices as shown. In step 206, the mobile devices monitor, record and transmit the telematic data to the cloud computing unit 110 and processors 102. The data may be stored in the system memory. The cloud computing unit 110 and processors 102 processes the telematic data to determine if the telematic data represents a situation where one or more trigger criteria have been met.

In step 208, the trigger criteria 118 is received and used by the processors 102 to compare the telematic data from step 206 to the trigger criteria of step 203. The processors may interpret the telematic data using the various algorithms to determine if the trigger criteria has been met as part of step 208. In step 208, the computing system 110 processes the telematic data from the mobile devices 114 to determine if any trigger criteria generated by the processing entity 117 and/or mobile devices 114 have been met. The determination/presence of a trigger criteria may be stored in the system memory.

If the processor interprets the data to determine that the trigger criteria has been met then the system will initiate a request to share information in step 210. The request to share information will be initiated by one or more processors including at the processing entity and/or the mobile devices or at other locations. Such request to share information will be sent to third party devices 116. The third party devices may acknowledge or affirm such a request; if affirmed the information from the mobile devices is then shared with the third party devices in step 212. The shared information may then be displayed by the third party devices in step 214. The sharing of information, notifications and acknowledgment may be stored in the system memory.

If the trigger criteria is not met in step 208 or the request to share information is not affirmed, the system continues to operate and obtain telematic information from the mobile devices in step 206 and continues to compare the telematic information to determine if any trigger criteria has been met in step 208. Such calculations are continuously and/or periodically performed over time.

In addition, the system continuously obtains telematic including GPS data after the information related to mobile devices are shared. Accordingly, the system continues to determine if any specified trigger criteria have met and initiate addition request to share information and share information related to the mobile devices. The system operates automatically so that the steps of the process are performed by the one or more processors. The selection of the trigger criteria may be an operator of the processing entity such as an administrator of the system. The trigger criteria may be changed, cancelled or supplemented at any time during the process.

When a trigger criteria has been met, the notification sent by the computing unit 110 to each third party device 116 may be a text message with a URL link. The third party devices 116 receiving the notifications may open the link to authorize receiving the information. Alternatively, a separate or different notification protocol may be used once the third party device opens the URL link (or otherwise accepts or authorizes the information to be shared); the shared information is displayed on the third party device. The shared information may include the telematic information monitored by the mobile devices and/or information processed by the processor via the algorithms and processes to interpret the telematic information. For example, if the trigger criteria is initiated to share information based upon a hard breaking of a vehicle, the shared information may be that a hard breaking event has occurred and this information is based upon the processed information derived from the mobile devices such as deceleration data.

The mobile devices 114 are equipped with telematic monitoring and transmitting capabilities including for example smartphones and/or vehicle location monitoring units which are capable of obtaining, monitoring and transmitting GPS coordinates and data as well as other telematic data including but not limited to speed, altitude, weather conditions and temperature, acceleration and deceleration. Vehicles in order to obtain, monitor and/or transmit telematic data may be equipped with location monitoring units, which are readily commercially available and well known in the art. In addition, these location monitoring units are capable of obtaining monitoring and transmitting vehicle telematic data including GPS data, acceleration and deceleration data, engine and other vehicle diagnostic information such as fuel consumption and range, various fluid and/or mechanical pressures and temperatures and other vehicle diagnostic information.

Figure 4A:
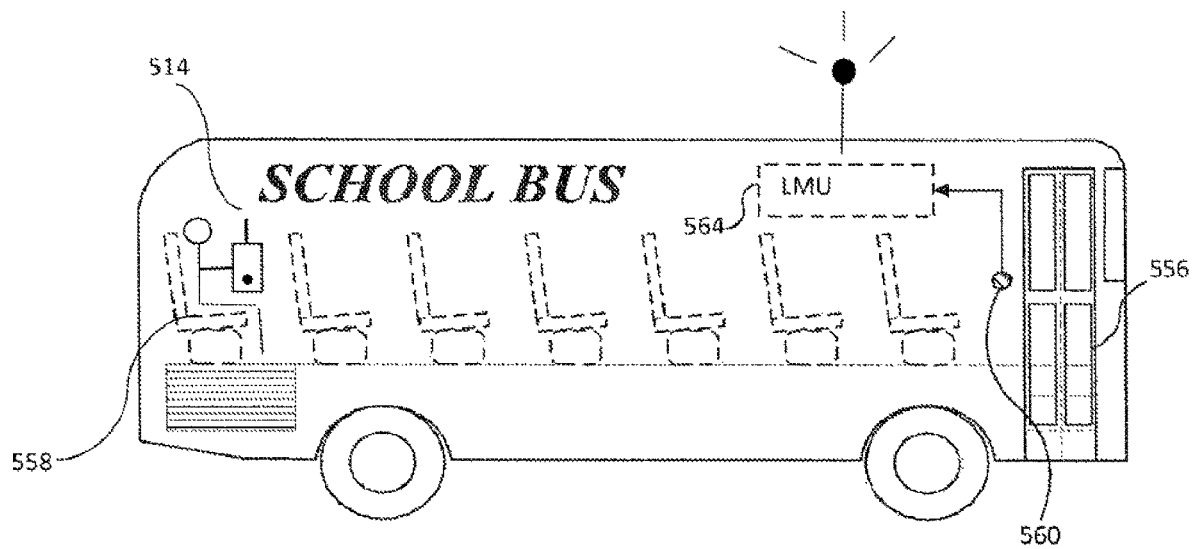
FIGS. 4A and 4B depict examples of mobile devices in accordance with one aspect of the present invention.
Figure 4B:
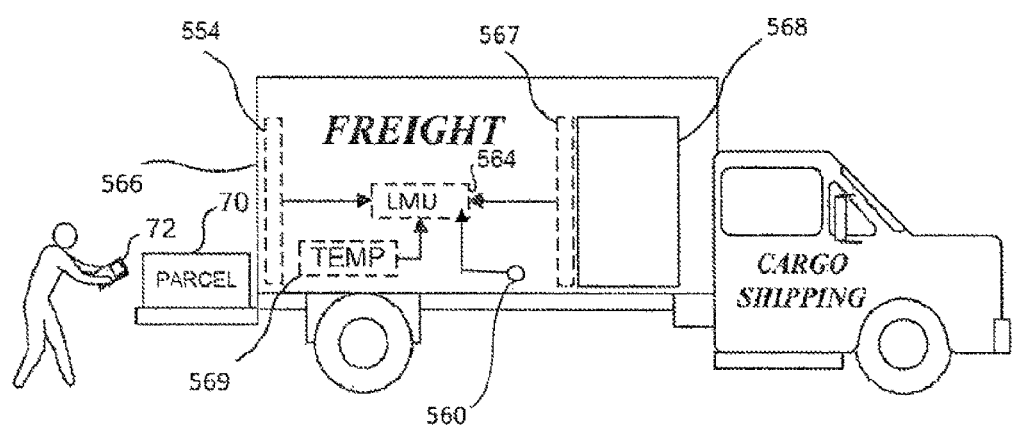

In FIG. 4A, a school bus 556 is shown as a mobile device in accordance with one aspect of the invention. Also, within the school bus passengers 558 may also possess their own smart phone mobile device 514. The school bus is equipped with a location monitoring unit 564, which obtains telematic data of the bus via one or more sensors 560. The sensors may be sensors previously existing in the bus and are part of the vehicle's onboard diagnostic system. In this regard, the location monitoring unit may interface with the vehicle's diagnostic system via standard ports. Additionally or alternatively, the sensors may be additional sensors which supplement and/or are separate from the vehicle's standard diagnostic system and sensors configured to read data and signals from various different bus systems and subsystems such as the engine, accelerator, wheels, doors, transmission, cabin, dashboard, etc. The location monitoring unit 564 typically receives such data from the various sensors and also generates GPS data relating to the bus location over time. The location monitoring unit transmits the aforementioned telematic data as well as any other desirable telematic data to the system computing environment 110 (FIG. 1). In FIG. 4B, a delivery truck mobile device 566 includes a similar locating monitoring unit 564, which may be in communication with vehicle system sensors 560 (as described above) as well as other sensors 567, 569, 554. Sensor 567 may monitor the data from a refrigeration unit 568, sensor 569 may monitor the temperature of the truck cargo area while sensor 554 monitors the position of the cargo door, e.g., opened or closed. The location monitoring unit 564 may transmit such telematic information to the computing environment 110 of the system 100 for sharing with third party external devices.

Figure 5:
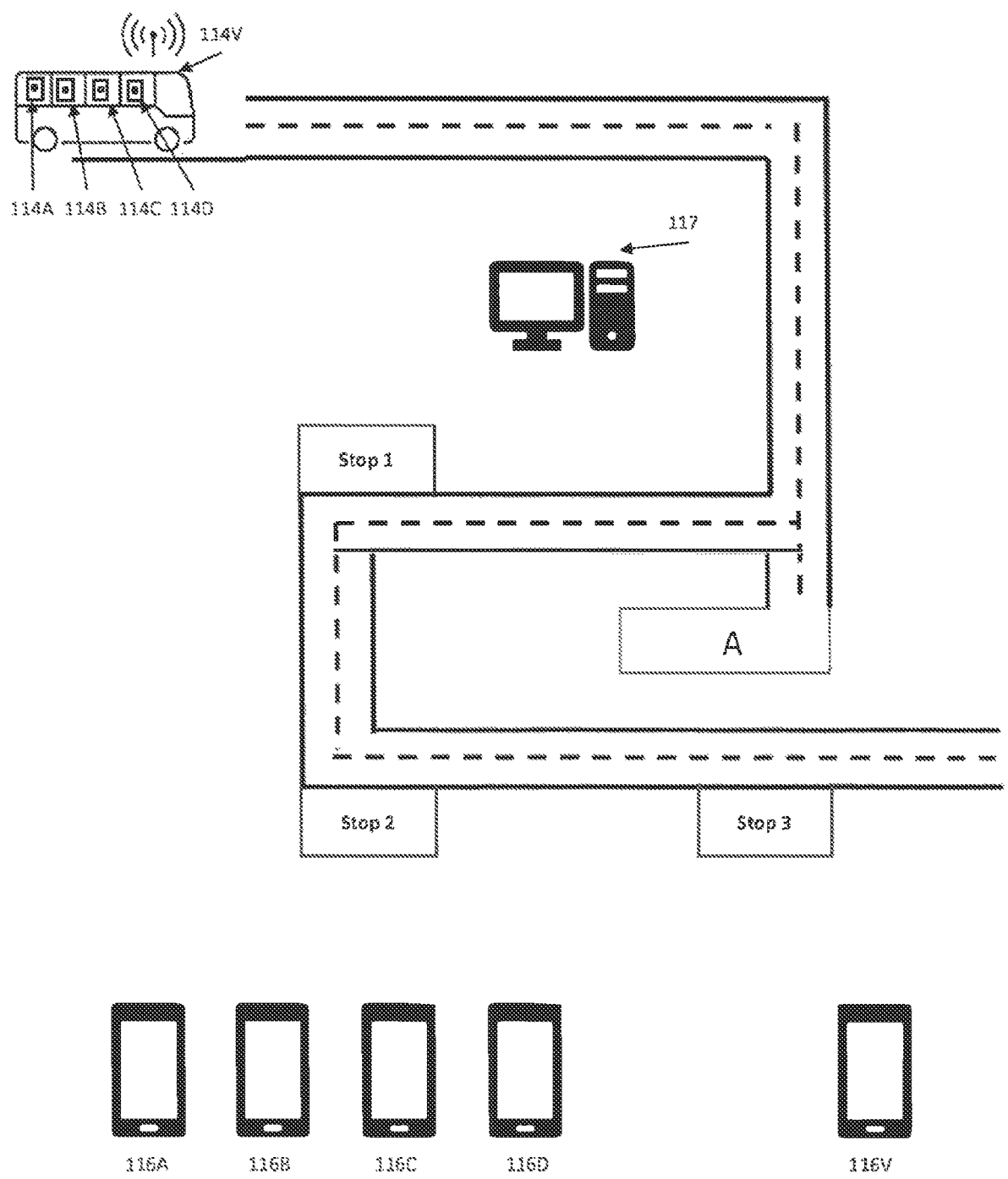
FIG. 5 depicts one example of a schematic representation of selectively managing and sharing information based upon telematic information related to mobile devices in accordance with an aspect of the present invention.

In accordance with one aspect and embodiment of the system, the system of selectively managing and sharing telematic information related to mobile devices will now be described with reference to FIG. 5. A plurality of mobile devices 114A-D include various smart phone devices. The smart phones may be in the possession of students who are riding in a school bus. The school bus is another mobile device 114V. The smart phones 114A-D are capable of maintaining, monitoring and transmitting various telematic information including GPS coordinates. The school bus 114V is configured with a telematic location monitoring unit which obtains, monitors and transmits various vehicle telematic information including GPS coordinates, speed, location, time, acceleration/deceleration, as well as various vehicle, mechanical and electrical diagnostic information. A processing entity 117 acting as an administrator designates the mobile devices 114A-D and 114V either being able to share or not share information. In this embodiment, processing entity 117 designates school bus 114V as sharing telematic information. In addition, processing entity 117 designates smart phones 114A-D as sharing telematic information. For purposes of clarity, there may be other smart phones in the possession of people within the school bus which the processing entity 117 does not designate as sharing telematic information.

Each mobile device designated as sharing information 114A-D and 114V has one or more third party devices 116A-D and 116V associated therewith for which telematic information from the mobile devices may be shared. For example, mobile smart phones 114A may be designated as sharing its telematic information and information based upon its telematic information with third party device 116A. In addition, mobile smart phone 114B may be designated to share its telematic and other information based thereon with third party devices 116B. Similarly, mobile devices and mobile smart phones 114C and 114D are designated as sharing their telematic information and information based upon such telematic information with third party devices 116C and 116D, respectively. The corresponding third party devices which are shared information from the mobile devices may be third party devices in the use, possession of, for example, parents or guardians of the students with the mobile smart phone devices. Finally, school bus mobile device 114V has a designated third party device 116V for which to share its telematic information and other information based upon the telematic information. For example, the third party device 116V may be an electronic communication device in the possession or use of a school administrator and/or school transportation official. Processing entity 117, acting as an administrator, and/or the mobile devices 114A-114D and 114V may either independently or jointly designate their current third party devices for sharing information thereto. Finally, the third party devices may together or independently from the processing entity 117 and/or mobile devices 114A-D, 114V, designate the corresponding mobile devices for which third party devices may be allowed to share information therefrom.

In this example, the processing entity 117 designates each mobile device 114A-D, 114V, to receive a trigger criteria. In this example, the processing entity 117 establishes a trigger criteria of each of the mobile devices being located in geographic area "A" in a particular period of time. For example, between the hours of noon and 4 pm on a particular date. The situation could correspond to, for example, a school bus taking students to a field trip on a particular day and time. In addition, processing entity 117 may establish a trigger criteria for smart phone 114A to share telematic information when smart phone 114A is located in the vicinity of geographic area of stop 1 and when school bus 114V is also located in the geographic area of stop 1 and the speed of the school bus is 0 mph (in other words the school bus is stopped). Similarly, the processing entity 117 establishes a trigger criteria for mobile devices 114B and 114C to share telematic information if they are in the geographic area of stop 2, and when the school bus 114V is in the geographic area of stop 2 and when the school bus stopped at this particular geographic area. Also, the processing entity 117 establishes a trigger criteria for mobile smart phone 114D to share telematic information when its telematic data shows that it is in the vicinity of geographic stop 3 and school bus 114V is stopped and its school bus door has been opened. Such examples of trigger criteria are for illustrative purposes and are not limited to such situations. The trigger criteria generated by the processing entity 117 may be based upon any telematic information obtained by the mobile devices 114A-114D, 114V including infinite combinations and permutations of telematic information from each of the mobile devices. With the aforementioned trigger criteria created, the mobile devices 114A-D and 114V continuously send telematic information the system for processing.

When the school bus travels into geographic area "A" during the hours of noon and 4 pm, a trigger criteria is met. When this trigger criteria is met, system automatically initiates a notification request each of third party devices 116A-116D and 116V. The notification request may include a text message, for example, a link to open for each of the third party devices. When the link is opened by a third party device, the link shares telematic information from the smart phones 114A-114D, for example, that their location is within geographic area "A" and at that particular time as well as other possible information such as video of the user of the smart phones 114A-114D. The telematic information may be shared for a particular duration of time established by the processing entity 117 and/or until the trigger criteria is no longer met at based upon the processing of the telematic data by the system. In other words, the location and time of the mobile devices within area "A" may be shared with the third party devices until such time as the mobile devices are no longer within geographic area "A". Additionally, and alternatively, the third party devices may choose to cease receiving shared information from the mobile devices at any time.

If the school bus 114V subsequently travels from geographic area "A" and arrives at stop 1 where it stops another trigger criteria may be met, namely, that mobile device 114A is within the geographic vicinity of stop 1 and school bus 114V is in the same geographic area and school bus 114V stopped. Again, at the time that this criteria is met, mobile device 114A is allowed to share its telematic information and a notification request to share the information from mobile device 114A is sent by the system to its associated third party device 116A. Third party device 116A may respond to the notification, again by opening a text message or some other message link. Upon accepting the message, the geographic area of mobile device 114A and/or school bus 114V is shared with third party device 116A and the information representing that mobile device 114A is at stop 1 and school bus 114V has stopped at that particular location. Also, other information based upon the telematic information may be sent to third party device 116A.

If school bus 114V continues on its travels to stop 2 and stops at this location, the telematic data processed from mobile devices 114B-C and school bus 114V will meet the trigger criteria showing that school bus 114V has stopped and school bus 114V and mobile devices 114B-C are located at stop 2. Since this criteria is met, the system automatically initiates a notification from mobile devices 114B and C showing that the mobile devices 114B and C are located at stop 2 and the school bus 114V has stopped at that particular location. The notification may be received by third party devices 116B and 116C and if the notification is confirmed by the third party devices, the information representing that the school bus and mobile devices have stopped at location number 2, be displayed on third party devices 116B and 116C. Also, other information may be sent to those third party devices.

When the school bus travels to stop 3 and mobile device 114D is located at that location and the school bus door has opened and the school bus has stopped, the telematic information from the school bus 114V and mobile device 114D will show the existence of these conditions which also meet a trigger criteria established by processing entity 117. Again, an automatic notification will be sent by the system showing third party device 116D associated with mobile device 114D. The notification if accepted by third party device 116D will display on third party device 116D that school bus 114V has stopped at stop number 3 that mobile device 114D is located at that location and that the school bus door has opened.

In this example, the processing entity 117, acting as an administrator, also establishes a trigger criteria of the telematic information being a hard braking event by the school bus. The telematic information may be determined by the location monitoring unit of the school bus 114V which monitors acceleration and deceleration. The system may interpret the acceleration and deceleration telematic information as a hard braking event. The associated third party device 116V may respond to such notification again by opening message link to thereby receive information indicating that school bus 114V has been involved a hard braking incident.

The telematic information shared upon the occurrence of a trigger criteria when the notification has been accepted may not be limited to the telematic information which causes the trigger criteria. For example, the trigger criteria may cause a notification to be sent for which telematic information will be shared once the notification is accepted. However, additional telematic information in lieu of and/or in addition to the telematic information which created the trigger criteria being met be shared with any associated third party device and such information may include general information about the third party devices including a video stream from the third party device.

In addition to the system being used to share telematic information and/or information derived from telematic information in real time, as previously described, the system may be used to share information based upon historical telematic data.

When operating using real time data, the system may be used by users who are responsible for monitoring the locations of mobile devices, including a fleet of vehicles such as buses, or trolleys, or delivery trucks, and passengers, to determine if telematic information should be shared. This information may be used to share telematic data and information simultaneously from multiple mobile devices that are on either the same travel routes and/or different travel routes. Also, the system may be used by users of buses or trolleys, such as in public transportation routes.

In addition, the system may store telematic data as historical data accumulated over time and stored in the system or remotely. The historical telematic data can be used to perform data analytics or mobile objects and planned travel routes.

One example of a computer system that includes processors that may be used by one or more aspects of the present invention is described with reference to FIG. 6. In this example, the computer system is part of a computing environment including additional components that may or may not be used by aspects of the present invention.

Figure 6:
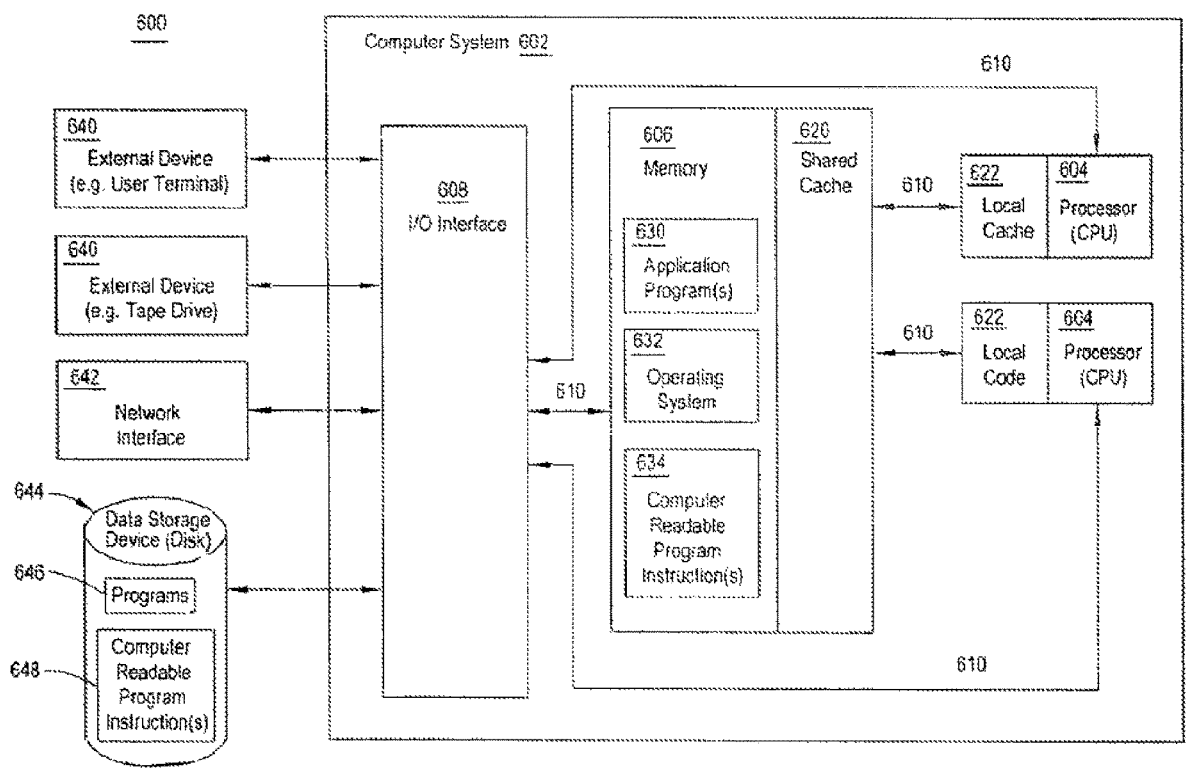
FIG. 6 depicts one example of a computing environment which may be used to incorporate and perform one or more aspects of the present invention.

As shown in FIG. 6, a computing environment 600 useable to perform the process of this invention and as part of a system to facilitate the invention is disclosed. The computing environment may include multiple processors and memory including those present in the mobile devices, processing entity and/or third party devices, or a more centralized system. The computing environment includes, for instance, a computer system 602 shown, e.g., in the form of a general-purpose computing device. Computer system 602 may include, but is not limited to, one or more processors or processing units 604 (e.g., central processing units (CPUs)), a memory 606 (a.k.a., system memory, main memory, main storage, central storage or storage, as examples), and one or more input/output (I/O) interfaces 608, coupled to one another via one or more buses and/or other connections 610.

Bus 610 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 606 may include, for instance, a cache 620, such as a shared cache, which may be coupled to local caches 622 of processors 604. Further, memory 606 may include one or more programs or applications 630, an operating system 632, and one or more computer readable program instructions 634. Computer readable program instructions 634 may be configured to carry out functions of embodiments of aspects of the invention.

Computer system 602 may also communicate via, e.g., I/O interfaces 608 with one or more external devices 640, one or more network interfaces 642, and/or one or more data storage devices 644. Example external devices include a user terminal, a tape drive, a pointing device, a display, etc. Network interface 642 enables computer system 602 to communicate with one or more networks, such as a local area network (LAN), a general wide area network (WAN), and/or a public network (e.g., the Internet), providing communication with other computer devices or systems. For example, the system may be connected to a personal computer, tablet device or smartphone to communicate the assigned or unassigned status of mobile objects to user via a graphical user interface.

Data storage device 644 may store one or more programs 646, one or more computer readable program instructions 648, and/or data, etc. The computer readable program instructions may be configured to carry out functions of embodiments of aspects of the invention.

Computer system 602 may include and/or be coupled to removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with computer system 602. Examples, include, but are not limited to: microcode, device drivers, redundant processing units, external disk drive arrays, RAID systems, tape drives, and data archival storage systems, etc.

Computer system 602 may be operational with numerous other general purpose or special purpose computing system environments or configurations. Examples of well-known computing systems, environments, and/or configurations that may be suitable for use with computer system 602 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

One or more of the processors and/or other aspects of the computer system or computing environment may be remote from the mobile devices. Further, in one particular example, a processor, such as processor 604, may execute, in accordance with one or more aspects of the present invention, one or more machine learning engines and/or other engines to provide, based on training and learning, based upon telematic information of the mobile devices. These engines may be stored in memory, including main memory and/or one or more caches, and/or external storage, and may be executed on one or more processors. Many variations exist.

One or more aspects of the present invention are inextricably tied to computer technology and/or to the improvement of a technical field.

One or more aspects may relate to cloud computing. It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages such as Angular, HTML, CSS, .NET Framework, C# and Microsoft SQL Server, and including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, different types of mobile devices, third party devices, processing entities may be used, as well as other types of neural networks and/or evolutionary algorithms. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

The invention claimed is:

1. A method of selectively managing and sharing information based upon telematic information related to mobile devices comprising:
automatically receiving, by one or more processors, telematic data from one or more mobile devices;
receiving, by said one or more processors, one or more trigger criteria from at least one processing entity, the trigger criteria being based upon said telematic data and representing an event to initiate a request to share information relating to said one or more mobile devices;
automatically initiating, by the one or more processors, a notification representing a request to share the information to at least one external third party device based upon the telematic data corresponding to the trigger criteria;
performing an action, by the one or more processors, comprising automatically sharing the information with the at least one external third party device based upon a response to said notification received by the one or more processors, said response initiated from said at least one external third party device; and
facilitating displaying the information on the at least one external third party device.

2. The method of claim 1 wherein the receiving one or more trigger criteria from at least one processing entity comprises which of said one or more mobile devices will be the subject of the request to share information, the information to be shared and/or when the information is shared.

3. The method of claim 2 wherein the trigger criteria is controlled by the at least one processing entity.

4. The method of claim 2 wherein the trigger criteria comprises physical, environmental, geographical and/or time data relating to said one or more mobile devices.

5. The method of claim 4 wherein the one or more mobile devices comprise a vehicle, mobile computing device and/or mobile communication device.

6. The method of claim 5 wherein the notification comprises a link to access the information.

7. The method of claim 4 wherein the trigger criteria comprises one or more of physical, environmental, geographical, or time data relating to the one or more mobile devices, the date, time, whether the mobile devices enters a geographic region or leaves a geographic region, whether the mobile device deviated a preselected distance from a planned path, the distance from a selected location, elevation, temperature, humidity, precipitation, weather factors, any data monitored, captured or transmitted by the mobile device, motion starting or stopping, speed, direction, idle duration, engine status, mechanical and electrical vehicle conditions, tire pressure, a door being open, lights activated, impact detected, fuel level, panic button activated, the embarking or disembarking of an object including passengers from a vehicle, and the start or end of an particular event or session.

8. A computer system for selectively managing and sharing information based upon telematic information related to mobile devices comprising:
a memory; and
one or more processors in communication with the memory, wherein the computer system is configured to perform a method, the method comprising:
automatically receiving, by one or more processors, telematic data from one or more mobile devices;
receiving, by said one or more processors, one or more trigger criteria from at least one processing entity, the trigger criteria being based upon said telematic data and representing an event to initiate a request to share information relating to said one or more mobile devices;
automatically initiating, by the one or more processors, a notification representing a request to share the information to at least one external third party device based upon the telematic data corresponding to the trigger criteria;
performing an action, by the one or more processors, comprising automatically sharing the information with the at least one external third party device based upon a response to said notification received by the one or more processors, said response initiated from said at least one external third party device; and facilitating displaying the information on the at least one external third party device.

9. The system of claim 8 wherein the receiving one or more trigger criteria from at least one processing entity comprises which of said one or more mobile devices will be the subject of the request to share information, the information to be shared and/or when the information is shared.

10. The system of claim 9 wherein the trigger criteria is controlled by the at least one processing entity.

11. The system of claim 10 wherein the trigger criteria comprises physical, environmental, geographical and/or time data relating to said one or more mobile devices.

12. The system of claim 11 wherein the one or more mobile devices comprise a vehicle, mobile computing device and/or mobile communication device.

13. The system of claim 12 wherein the notification comprises a link to access the information.

14. The system of claim 13 wherein the trigger criteria comprises one or more of physical, environmental, geographical, time data relating to the one or more mobile devices, the date, time, whether the mobile devices enters a geographic region or leaves a geographic region, whether the mobile device deviated a preselected distance from a planned path, the distance from a selected location, elevation, temperature, humidity, precipitation, weather factors, any data monitored, captured or transmitted by the mobile device, motion starting or stopping, speed, direction, idle duration, engine status, mechanical and electrical vehicle conditions, tire pressure, a door being open, lights activated, impact detected, fuel level, panic button activated, the embarking or disembarking of an object including passengers from a vehicle, and the start or end of an particular event or session.

15. A computer program product for selectively managing and sharing information based upon telematic information related to mobile devices comprising:
at least one non-transitory computer readable storage medium readable by a processing circuit for performing a method comprising:
receiving, by one or more processors, telematic data from one or more mobile devices;
automatically receiving, by said one or more processors, one or more trigger criteria from at least one processing entity, the trigger criteria being based upon said telematic data and representing an event to initiate a request to share information relating to said one or more mobile devices;
automatically initiating, by the one or more processors, a notification representing a request to share the information to at least one external third party device based upon the telematic data corresponding to the trigger criteria;
performing an action, by the one or more processors, comprising automatically sharing the information with the at least one external third party device based upon a response to said notification received by the one or more processors, said response initiated from said at least one external third party device; and
facilitating displaying the information on the at least one external third party device.

16. The computer program product of claim 15 wherein the receiving of one or more trigger criteria from at least one processing entity comprises which of said one or more mobile devices will be the subject of the request to share information, the information to be shared and/or when the information is shared.

17. The computer program product of claim 16 wherein the trigger criteria is controlled by the at least one processing entity.

18. The computer program product of claim 17 wherein the trigger criteria comprises physical, environmental, geographical and/or time data relating to said one or more mobile devices.

19. The computer program product of claim 18 wherein the one or more mobile devices comprise a vehicle, mobile computing device and/or mobile communication device.

20. The computer program product of claim 19 wherein the notification comprises a link to access the information.

21. The computer program product of claim 20 wherein the trigger criteria comprises one or more of physical, environmental, geographical, time data relating to the one or more mobile devices, the date, time, whether the mobile devices enters a geographic region or leaves a geographic region, whether the mobile device deviated a preselected distance from a planned path, the distance from a selected location, elevation, temperature, humidity, precipitation, weather factors, any data monitored, captured or transmitted by the mobile device, motion starting or stopping, speed, direction, idle duration, engine status, mechanical and electrical vehicle conditions, tire pressure, a door being open, lights activated, impact detected, fuel level, panic button activated, the embarking or disembarking of an object including passengers from a vehicle, and the start or end of an particular event or session.

* * * * *